United States Patent Office 3,756,968
Patented Sept. 4, 1973

3,756,968
CYCLIC ETHER POLYMERIZATION PROCESS
John Boor, Jr., El Cerrito, Calif., assignor to Shell
Oil Company, New York, N.Y.
No Drawing. Filed Aug. 9, 1971, Ser. No. 170,393
Int. Cl. C08g 23/14
U.S. Cl. 260—2 A
7 Claims

ABSTRACT OF THE DISCLOSURE

Vicinal epoxides are polymerized to high molecular weight polyether-type polymers in the presence of a catalyst formed by reacting (A) a premixture of (1) at least one dialkyl zinc compound, and (2) a primary or secondary amine and (B) a sulfur compound having the formula H—S—R wherein R represents hydrogen or a mercapto-substituted hydrocarbon radical. The high molecular weight polymeric products are useful in moldings, coatings, films and fibers.

---

This invention relates to a new process for the preparation of polyether-type homopolymers and/or copolymers. More particularly this invention relates to a process for preparing polymers of monoepoxides employing a novel catalyst system. The invention further relates to novel polymerization catalysts and to a method for preparing them.

The polymerization of vicinal epoxides such as alkylene oxides is well known and is discussed, for example, by J. Furukawa and T. Saegusa, Polymerization of Aldehydes and Oxides, Interscience Publishers, New York (1963).

It is known from U.S. 3,313,741 to polymerize epoxides containing up to 70 carbon atoms with a catalyst system comprising the reaction product of (A) a premixture of (1) an organometallic compound of zinc or cadmium and (2) any organic compound which is free of active hydrogen and which contains at least one tertiary nitrogen, ethereal oxygen or thioethereal sulfur atom; and (B) a compound containing an active hydrogen atom.

Generally speaking, the polymerization of vicinal epoxides becomes more difficult as the number of carbon atoms per molecule increases and particularly the polymerization of epoxides which have two substituents on one carbon atom, such as isobutylene oxide, has been considered very difficult.

A new process has now been found for the preparation of high molecular weight polyethers with the aid of a novel catalyst system which is very active to polymerize, e.g., isobutylene oxide.

According to the invention, polyether-type homopolymers and/or copolymers are prepared by a process which comprises polymerizing at least one vicinal monoepoxide of 2 to 10 carbon atoms selected from linear and branched aliphatic epoxides, and aromatic epoxides, with a catalyst formed upon reacting (A) a mixture of (1) a dialkyl zinc compound wherein the alkyl groups which can be identical or non-identical each contain up to 8 carbon atoms and (2) a primary or secondary amine compound of up to 18 carbon atoms and (B) a sulfur compound of the formula H—S—R wherein R represents hydrogen or —YSH and Y represents hydrocarbon radicals containing up to about 9 carbon atoms.

The monoepoxides to be polymerized are preferably vicinal 1,2 monoepoxides containing up to about 10 carbon atoms, and most preferably from 3 to 9 carbon atoms. Alicyclic monoepoxides such as cyclopentene oxide are excluded as they are scarcely polymerized in the process according to the invention. Exemplary vicinal 1,2 monoepoxides are ethylene oxide, propylene oxide, butylene oxide, isobutylene oxide, methyl glycidyl ethers, propyl glycidyl ether, allyl glycidyl ether, phenyl glycidyl ether, styrene oxide and butadiene monoxide. Preferred monoepoxides include propylene oxide, isobutylene oxide, allyl glycidyl ether, styrene oxide, phenyl glycidyl ether and mixtures of these. It is especially preferred to employ mixtures wherein isobutylene oxide amounts to at least 50 mole percent (percent m.), particularly at least 75% m. of the total epoxide monomer.

The catalyst is prepared at a temperature in the range between about —80° to about 150° C. Temperatures in the range from about —30° C. to about 10° C. being preferred when hydrogen sulfide is employed as the sulfur compound to avoid high pressures.

Catalyst component (A) is a mixture of components (1) i.e., dialkyl zinc compound and (2) i.e., certain amine compounds.

Catalyst component (1) will preferably contain alkyl radicals which may be identical or non-identical of up to 8 carbon atoms. Dialkyl zinc compounds wherein the alkyl groups contain up to 4 carbon atoms are particularly preferred. Examples of component (1) are dimethyl zinc, diethyl zinc, di-n-propyl zinc, ethyl propyl zinc, di-n-butyl zinc, n-propyl isobutyl zinc, and n-butyl-isopentyl zinc. The preferred component (a) is diethyl zinc. It has been found that replacement of these dialkyl zinc compounds with alkyl compounds of other divalent metals such as diethyl cadmium does not result in catalysts effective for polymerization of, e.g., isobutylene oxide.

Catalyst component (2) is a free hydrogen-containing primary or secondary amine containing up to 18 carbon atoms; monoamines, especially those containing up to 12 carbon atoms, such as cyclohexylamine, being preferred. Examples include methylamine, ethylamine, isopropylamine, n-butylamine, isobutylamine, sec-butylamine, pentylamine, cyclohexylamine, heptylamine, dodecylamine, octadecylamine, dimethylamine, diethylamine, dicyclohexylamine, methylethylamine, ethylbutylamine, aniline, α-naphthylamine, β-naphthylamine, o-toluidine, p-ethylaniline, p-butylaniline, α-phenylethylamine and the like.

Catalyst component (B) is a sulfur compound of the formula H—S—R wherein the symbol R represents hydrogen or Y—SH wherein Y is a monovalent hydrocarbyl radical which may be alkyl, aryl or alkaryl containing up to about 9 carbon atoms; for example 1 to 6 carbon atoms. Exemplary are hydrogen sulfide, 1,2 dimercaptoethane, 1,3 dimercaptopropane, 1,4 dimercaptobutane, 1,4-dimercapto-3-methyl benzene, 1,4 dimercapto-3-ethyl benzene, 1-mercapto-4-mercaptoethyl benzene and the like. Hydrogen sulfide is preferred.

In the preparation of a catalyst according to the invention the components are preferably employed in a molar ratio of zinc compound to amine to sulfur compound between about 1:0.01:0.01 and about 1:1:1. Particularly preferred ratios of zinc compound:amine:sulfur compound are between about 1:0.02:0.02 to about 1:0.5:0.5.

Best results are obtained if as much as possible of any soluble and/or volatile components are removed before the reaction product is used as a catalyst.

Generally, the catalyst is prepared with the use of a solvent; the polymerization may be carried out in bulk but preferably in the presence of a solvent or diluent. Solvents suitably employed include hydrocarbons boiling below about 200° C. such as pentane, hexane, heptane, methylcyclohexane, benzene, toluene, xylene, ethers such as diethyl ether, chlorinated hydrocarbons such as carbon tetrachloride, chlorobenzene and mixtures of these.

The amount of catalyst used in polymerizing the vicinal monoepoxide will ordinarily vary from about 0.002 to about 5 moles of zinc per mole of total monomer.

The temperature at which the vicinal monoepoxides are polymerized is preferably between about 30 to about 150° C.; temperatures between about 60 and 140° C. being most preferred.

The products obtained according to the invention are high molecular weight polymers which may be rubbers or plastics depending upon the particular monomers and ratios of the monomers polymerized. For example, homopolymers of propylene oxide, ethylene oxide, butadiene monoxide and copolymers consisting substantially of these epoxides are rubbery products suitable for adhesives, caulking compositions and the like. On the other hand, high molecular weight homopolymers and copolymers consisting substantially of isobutylene oxide are thermoplastic materials suitable for moldings, coatings, fibers and films.

In the following examples the bottles used as reaction vessels were previously dried and purged with nitrogen. The monomer was dried with molecular sieves and then distilled from calcium hydride about one hour before each experiment. Solvents were purified as follows: toluene was washed with sulfuric acid, sodium carbonate solution and distilled water, then passed through silica gel, mixed with calcium hydride, filtered, distilled from fresh calcium hydride and finally was stored under a nitrogen atmosphere and in the presence of calcium hydride. Heptane was passed through silica gel, distilled from calcium hydride and stored in the manner described for toluene. At the termination of a polymerization the products were added to methanol containing 5% w. hydrochloric or glacial acetic acid; the mixture was allowed to stand overnight and then filtered, followed by drying in under vacuum at 60° C. The reduced specific viscosities (RSV) values shown were determined at a concentration of 0.3 gram of polymer per 100 cc. of O-dichlorobenzene at 150° C. containing 0.3% by weight of β-naphthylamine inhibitor.

EXAMPLE I

To a centrifuge bottle which has been dried and flushed with nitrogen and covered with a serum cap were added 50 cc. of toluene, 28 millimoles of diethyl zinc (1.5 molar) in heptane and 0.7 cc. of cyclohexylamine. This solution was cooled to a temperature of about 5° C. From a cold solution (0–5° C.) of hydrogen sulfide in toluene, 12 millimoles of $H_2S$ were added to the centrifuge bottle which was kept at about 5° C., resulting in a molar ratio of 1:0.27:0.43. After about 30 minutes this mixture was then warmed to ambient temperature (about 25° C.) and allowed to stand overnight. The mixture was then centrifuged and the supernatant solution removed. Fresh toluene containing some diethyl zinc (0.25 molar) was added to wash the solid material, followed by centrifugation and removal of the supernatant liquid. The washing-centrifugation step was repeated. Finally, about 35 cc. of heptane containing some diethyl zinc (0.01 molar) was added to make a catalyst slurry one half of which was transferred to a dried eight ounce bottle which had been previously purged with nitrogen. Sixteen and one half grams of isobutylene oxide were added and polymerized for 42 hours at 70° C., resulting in a 43% conversion to a powdery white homopolymer which had a reduced specific viscosity of 1.88 dl./g. at 150° C. in O-dichlorobenzene.

EXAMPLE II

For purposes of comparison a catalyst not according to the invention was used. The procedure of Example I was repeated except that the amine component of the catalyst was omitted. The conversion of isobutylene oxide after 42 hours at 70° C. was 3%.

EXAMPLE III

In another comparison a catalyst prepared by a procedure not according to the invention was employed. The procedure of Example I was repeated except that after the solid catalyst according to the invention was washed with toluene, additional (0.35 cc.) cyclohexylamine was added to the eight ounce bottle followed by the addition of the isobutylene oxide. The conversion of isobutylene oxide to polymer after 42 hours at 70° C. was 3%.

EXAMPLE IV

Into an eight ounce dried bottle which had been purged with nitrogen was added a catalyst prepared according to the procedure of Example I except that only 14 millimoles of diethyl zinc were added and the catalyst was aged for 24 hours at 25° C. The mole ratio of components in this catalyst, that is, dialkyl zinc:amine:hydrogen sulfide was 1:0.27:0.43. Twenty-two grams of styrene oxide were added. The conversion to polymer after 46 hours at 70° C. was 100%.

EXAMPLE V

The procedure of Example IV was repeated except that the styrene oxide was replaced with 17 grams of propylene oxide. 81% conversion to polymer was found.

EXAMPLE VI

For purposes of comparison the procedure of Example IV was repeated employing a monomer not according to the invention, i.e., an alicyclic epoxide. The styrene oxide was replaced with twenty grams of cyclopentene oxide. The conversion after 46 hours at 70° C. was 1%.

I claim as my invention:

1. A process for the preparation of polyethers which comprises contacting at least one vicinal monoepoxide of 2 to 10 carbon atoms selected from linear and branched aliphatic monoepoxides and aromatic monoepoxides with a solid catalyst which forms upon reacting (A) a premixture of (1) at least one dialkyl zinc compound wherein the alkyl group, which may be identical or non-identical, contains from 1 to 8 carbon atoms and (2) a primary or secondary amine of up to 18 carbon atoms, and (B) hydrogen sulfide; the molar ratio of said zinc compound to said amine to said sulfide being between about 1:0.01:0.01 and about 1:1:1.

2. A process as in claim 1 wherein said molar ratio of zinc compound:amine:sulfide is between 1:0.02:0.02 and 1:0.5:0.5.

3. A process as in claim 1 wherein the vicinal monoepoxide is selected from ethylene oxide, propylene oxide, isobutylene oxide, allyl glycidyl ether, phenyl glycidyl ether, styrene oxide and mixtures of these.

4. A process as in claim 1 wherein the vicinal monoepoxide is at least 50 mole percent isobutylene oxide.

5. The solid catalyst which forms upon reacting (A) a premixture of (1) at least one dialkyl zinc compound wherein the alkyl groups, which may be identical or non-identical, contain from 1 to 8 carbon atoms, and (2) a primary or secondary amine of up to 18 carbon atoms; and (B) hydrogen sulfide; the molar ratio of said zinc compound to said amine to said sulfide being between about 1:0.01:0.01 and about 1:1:1.

6. A catalyst according to claim 5 wherein in said dialkyl zinc compound the alkyl group contains up to four carbon atoms.

7. A catalyst according to claim 5 wherein the dialkyl zinc compound is diethyl zinc, and the amine is cyclohexylamine.

References Cited
UNITED STATES PATENTS 3,231,551 1/1966 Herold et al. _____ 260—88.3
3,284,374 11/1966 Daimon et al. _____ 260—2

WILLIAM H. SHORT, Primary Examiner

E. A. NIELSEN, Assistant Examiner

U.S. Cl. X.R.

252—431 N; 260—47 EP, 615 B